April 10, 1956  J. J. BARSKI ET AL  2,741,133
BELT DRIVE
Filed June 5, 1953  2 Sheets-Sheet 2
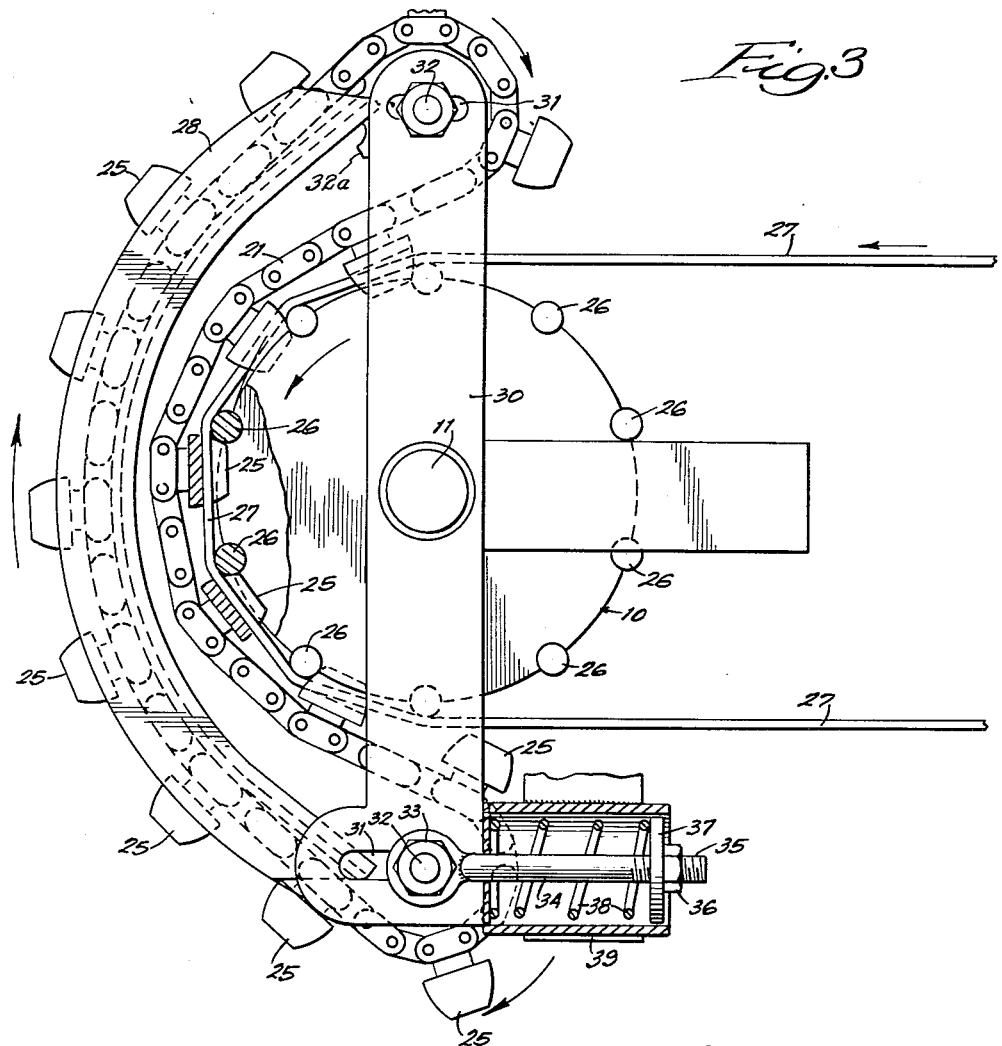
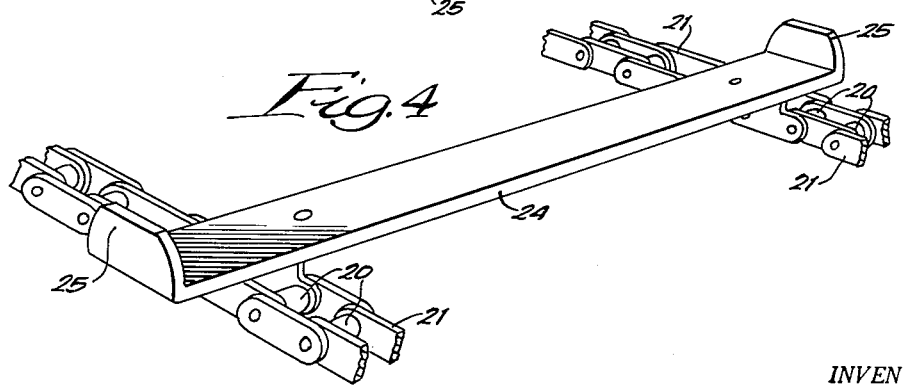
INVENTORS:
Julius J. Barski and
Harry D. Lathrop,
BY Dawson, Tilton & Graham,
ATTORNEYS.

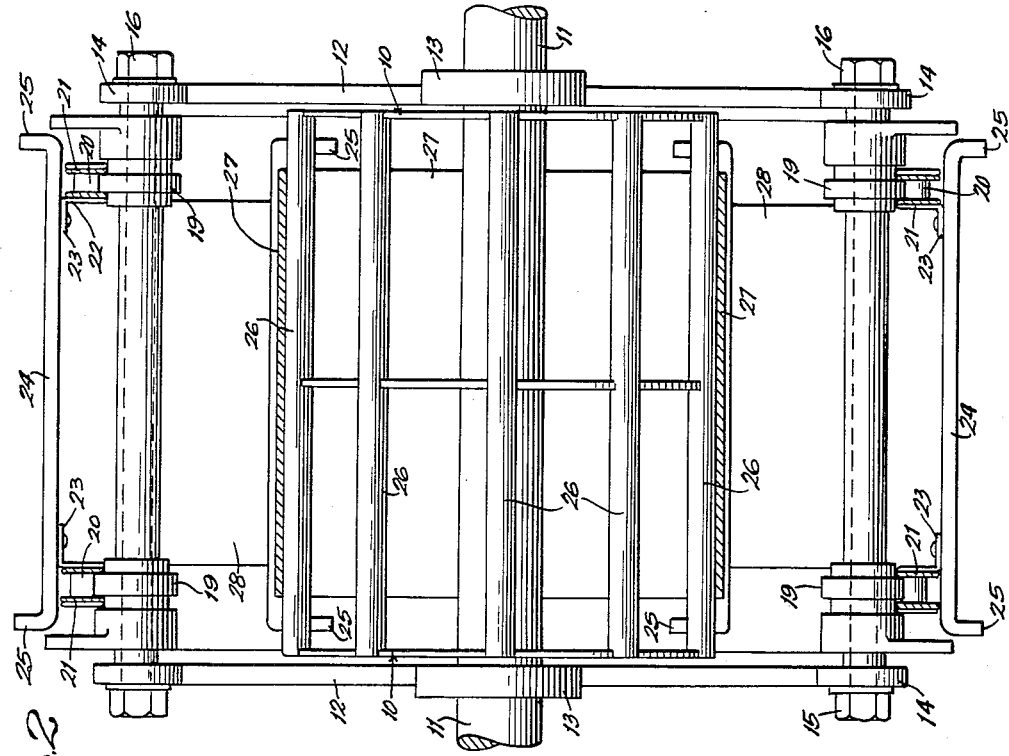

United States Patent Office 2,741,133
Patented Apr. 10, 1956

2,741,133

BELT DRIVE

Julius J. Barski and Harry D. Lathrop, Chicago, Ill., assignors to The Lathrop-Paulson Company, Chicago, Ill., a corporation of Illinois Application June 5, 1953, Serial No. 359,856

3 Claims. (Cl. 74—216.5)

This invention relates to a belt drive, and more particularly to a structure in which a belt is engaged on both sides by driving means for the effective operation of the belt.

In many operations, it is found that the belt tends to slip upon the drive drum or wheel and effective operation is not obtained. Particularly is such slipping tendency experienced in hardening rooms or refrigeration chambers and also under adverse conditions in other areas. While the belt may be tightened upon the driving wheel or drum, this imposes excessive wear upon the portion of the belt contacting the drum and frequent tearings of the belt occur. There has long been a need for means for causing the drum to drive the belt effectively while imposing no excessive strain or wear upon one side of the belt.

An object of the present invention is to provide relatively inexpensive and effective means for driving a belt without causing excessive wear upon one side of the belt. A further object is to provide means whereby a belt may be driven by employing driving means engaging the belt on opposite sides thereof. A still further object is to provide a flexible gear structure which is driven by means independent of the belt for engaging the outer side of the belt as the belt is being driven upon a drum. A still further object is to provide in such a flexible gear structure spring means for relieving the same under extreme conditions. Other specific objects and advantages will appear as the specification proceeds.

The invention is shown, in illustrative embodiments, by the accompanying drawings, in which—

Figure 1 is a broken end view in elevation of belt driving means employing structure embodying my invention; Fig. 2, a sectional view, the section being taken as indicated at line 2—2 of Fig. 1; Fig. 3, a side elevational and part sectional view of a modified form of the apparatus; and Fig. 4, a perspective view of the driving bar equipped with teeth and secured to drive chains.

In the illustration given in Figs. 1, 2 and 4, 10 designates a belt drive supported upon a shaft 11 carried by a suitable frame (not shown). At each end of the shaft 11 is a fixed frame member 12 providing a circular bearing 13 for receiving shaft 11. The frame 12 consists of a vertical shaft carrying the bearing 13 and supporting at its ends a metal bracket 14 provided with a horizontal slot in which is supported a shaft 15. The shaft 15 is provided at its end with a nut 16, and the nut 16 is adapted to be engaged by an adjustment screw 17 threadably engaging a tapped opening through the flange 18 with which the strip 14 is provided. By this means, the nut 16 and the shaft 15 may be adjusted in a horizontal plane. Instead of employing an adjustment screw 17, it will be understood that a spring support may be employed, as will be described later in connection with Fig. 3.

The shaft 15 is provided near each end with a bearing surface provided with a central raised ring or guide 19 adapted to bear against the central bearing 20 of the chain links 21. At spaced distances, one of the chain links is equipped with an upwardly-extending portion 22, which is then turned laterally at 23 and secured by rivets to cross bars 24. Each of the cross bars is provided at its ends with teeth 25.

As shown more clearly in Fig. 1, the drive wheel 10 is provided with transverse drive members 26 which may be in the form of rods or bars and which support the belt 27. The belt 27, as shown best in Fig. 2, extends only across the central portion of the drive wheel 10 so that the teeth 25 of the cross bar 24 extend laterally of the belt. Thus the teeth 25 make direct engagement with the cross bars 26, as illustrated more clearly in Fig. 1, and thus there is a driving of the outer chain gear formed of the links 21 through the medium of the teeth 25 in direct engagement with the rods or bars 26.

Each of the chain structures shown and formed by chain links 21 and carrying the cross bars 24 is in effect a flexible gear. The chain links permit the gear to assume the unusual curvature illustrated in Fig. 1 with the inner portion of the gear following the contour of the drum 10, while the outer portion of the gear, which is supported by a curved guide 28, follows a similar curvature but on a larger radius. The ends of the flexible gear thus formed by the chain links 21 and the bars 24 are held in looped form by the ring bearings 19 on shaft 15 and the chain gear may be tightened as desired by the screws 17.

It will be understood that the external chain gear or pair of gears may be supported in any desired manner so as to bring a portion of the gear into contact with one side of the drum 10. We have found, however, that the simple arrangement illustrated, in which the chain is guided upon a ring-equipped shaft at each end of the vertical bar 12, is very effective, the other portion of the chain being supported during the operation by the curved guide 28. However, it will be understood that considerable variation may be made in the manner of support for the flexible gear. In some instances, a single chain gear may be employed along one side of the belt. We prefer, however, to employ a pair of such gears because of the effectiveness of such chain gears in supporting the cross bar 24 in engagement with the outer surface of the belt 27.

In the modification shown in Fig. 3, the structure is the same as has heretofore been described except that the vertical frame standard 30 is provided at each end with a horizontal slot 31 in which the shaft 32 equipped with sprockets 32a supporting each of the chain gears is mounted for horizontal adjustment. At the lower end of the structure, we provide spring-urged means for supporting the shaft 32 so that under stress the shaft may move laterally within the slot 31. In other words, we provide a spring safety support. In the specific form illustrated, the shaft 32 is carried within a bearing member 33 and a rod 34 is secured thereto. The rod 34 is threaded at 35 to receive a nut 36 provided with a circular flange 37. A spring 38 engages the flange 37 and at the other end is secured to the shaft 32. The spring 38 is housed within a cylinder 39.

With the above structure, the rod 34 may yield with the bearing member 33 to enable the shaft 32 to move horizontally when undue stress is placed upon the chain gear formed by links 21 and cross bars 24. It will be understood that any spring support means may be employed to permit a yielding of either of the shafts 32 to relieve the pressure or strain upon the chain gear structure when this becomes necessary.

In the structure shown in Figs. 1 to 4, the shaft 11 is driven by a motor or other power means and rotates the drum 10 and the belt 27 thereon. The transverse bars 26 bear against the inside of the belt 27. At the same time, the bars 26 engage the teeth 25 of the cross bars 24 and, independently of the belt, force such cross bars forwardly. Since the cross bars engage the outer surfaces of the belt, it is found that such bars grip the belt along the outside and exert tension thereon so that the belt is advanced by the combined pressure of the members 26 and 24 both on the inside and the outside of the belt. By reason of such uniform gripping of the belt on both sides thereof, it is found that the belt does not readily part or break, but instead is carried along with great force and without undue wear thereon.

The chain gears or flexible gears described, which carry the cross bars 24 against the outside of the belt, are driven positively by the inner drum cross members 26 and thus independently of the belt 27, thus enabling a gripping action to be applied to the outside of the belt while the inside of the belt is also being engaged by the drum. The mechanism is simple and compact and is highly effective in driving the belt to carry a heavy load while at the same time avoiding undue stress or strain upon any portion of the belt.

While in the foregoing specification, we have set forth specific structures in considerable detail for the purpose of illustrating the invention, it will be understood that such details of structure may be varied widely by those skilled in the art without departing from the spirit of our invention.

We claim:

1. In combination with a frame, a drum mounted therein and equipped with transverse rods adapted to carry a belt thereon, a continuous belt having one end carried by the rods of said drum, a flexible gear frame mounted adjacent said drum, shafts carried by said frame extending to opposite sides of said drum, spaced sprockets carried by each of said shafts, a pair of chains engaging said sprockets and forming endless chains having a curved section in engagement with a portion of said drum, transverse bars extending between said chains and engageable with belt portions between the rods thereof to indent said belt portions inwardly between said rods, and teeth carried by the ends of said bars and engageable with said rods whereby rotation of said rods produces a like rotation of said chains and said bars.

2. The structure of claim 1, in which said drum is mounted upon a central shaft and the frame carrying said endless chains is also mounted upon said shaft.

3. In combination with a frame, a shaft rotatably mounted in said frame, a drum carried by said shaft and equipped with spaced transverse rods adapted to receive thereon a belt, an endless belt having a portion carried by said rods, a flexible gear frame also mounted upon said shaft and having laterally-extending portions on either side of said drum, shafts mounted in said laterally-extending frame portions and equipped with spaced sprockets, endless chains forming flexible gears mounted upon said sprockets, and transverse bars carried by said chains and equipped at their ends with inwardly-turned teeth engageable with the rods of said drum, one portion of the chains forming an arcuate body lying adjacent an arcuate portion of the drum and pressing the bars thereof inwardly to indent the belt portions between said bars.

References Cited in the file of this patent

UNITED STATES PATENTS

| 975,721 | Russell | Nov. 15, 1910 |
| 1,381,664 | Rogers | June 14, 1921 |

FOREIGN PATENTS

| 3,047 | Great Britain | A. D. 1876 |
| 248,585 | Great Britain | Mar. 11, 1926 |
| 601,826 | Great Britain | May 13, 1948 |